Feb. 23, 1932.   A. S. CHRISTENSEN   1,846,086
WATER WHEEL
Filed May 28, 1930   3 Sheets-Sheet 2

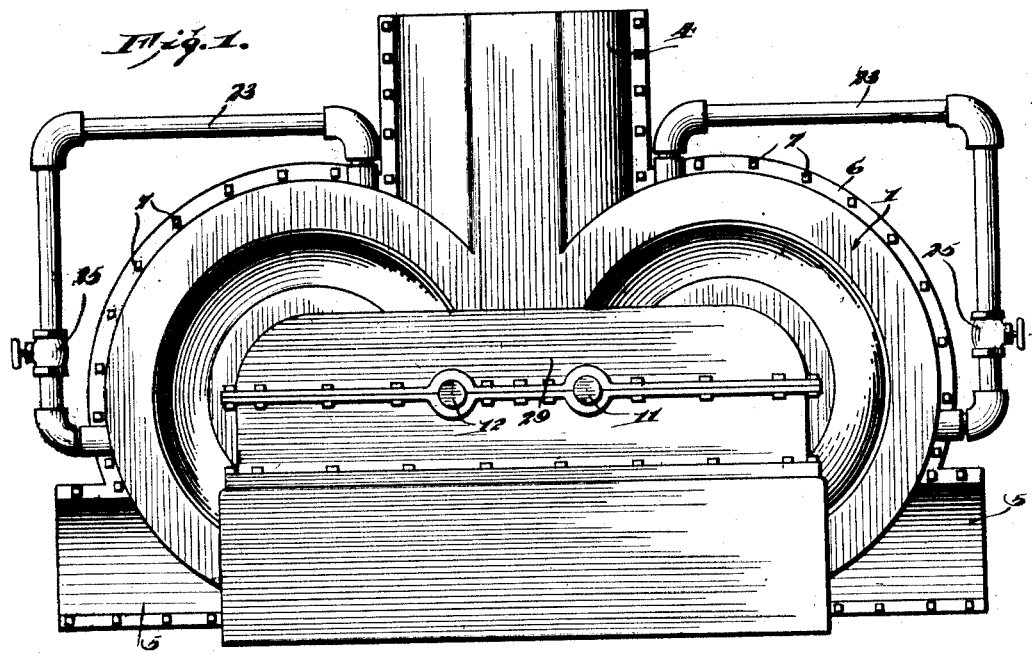
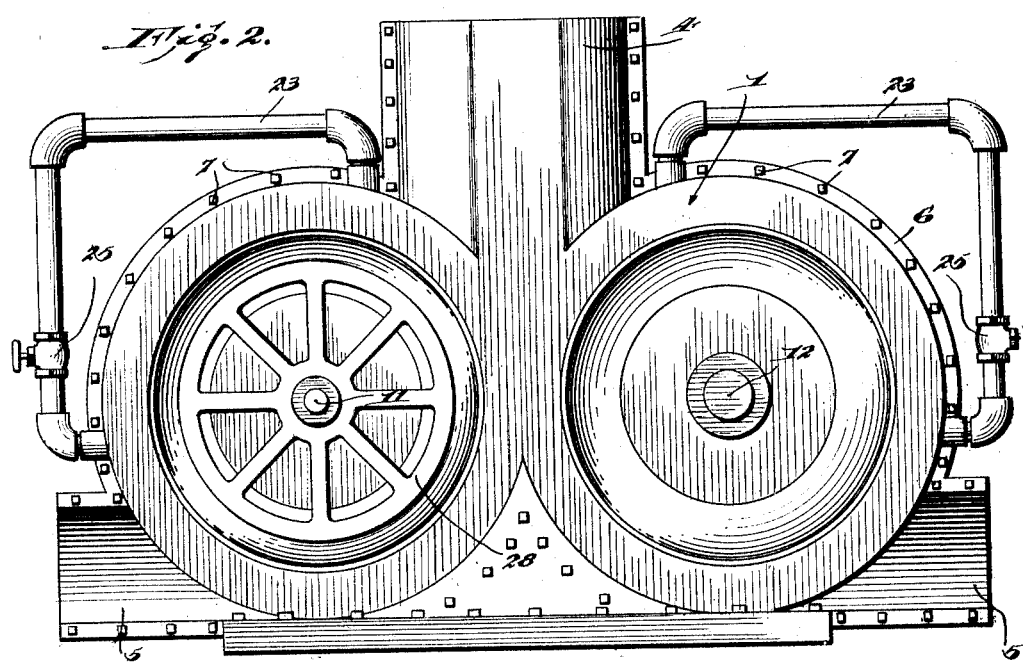

WITNESS

INVENTOR
A. S. Christensen,
BY

Feb. 23, 1932.  A. S. CHRISTENSEN  1,846,086
WATER WHEEL
Filed May 28, 1930   3 Sheets-Sheet 3

WITNESS

INVENTOR
A. S. Christensen,
BY
ATTORNEY

Patented Feb. 23, 1932

1,846,086

UNITED STATES PATENT OFFICE

AUGUST S. CHRISTENSEN, OF RESERVE, MONTANA

WATER WHEEL

Application filed May 28, 1930. Serial No. 459,810.

My invention relates to water motors, and it consists in the constructions, arrangements and combinations herein described and claimed.

It is an object of my invention to provide a water motor having a pair of wheels arranged in such manner that the full impact of water thereagainst will be utilized in the generation of power.

A further object of the invention is to provide an improved construction of water wheel wherein back pressure is eliminated, thereby reducing friction, and affording a more efficient operation of devices of this character.

A still further object of the invention is to provide means for utilizing air entrapped within the water wheel as a governor for regulating the speed of the water motor.

Figure 3:
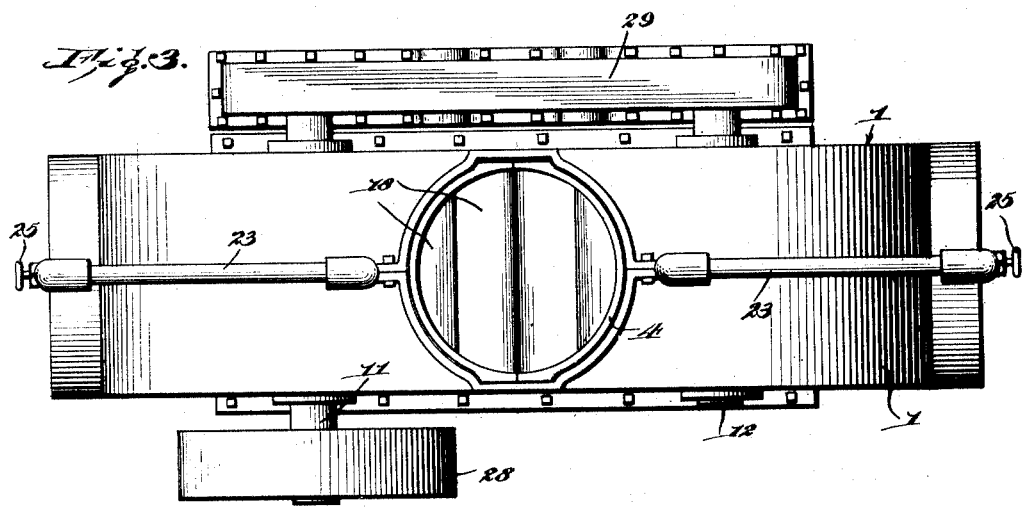
Figure 4:
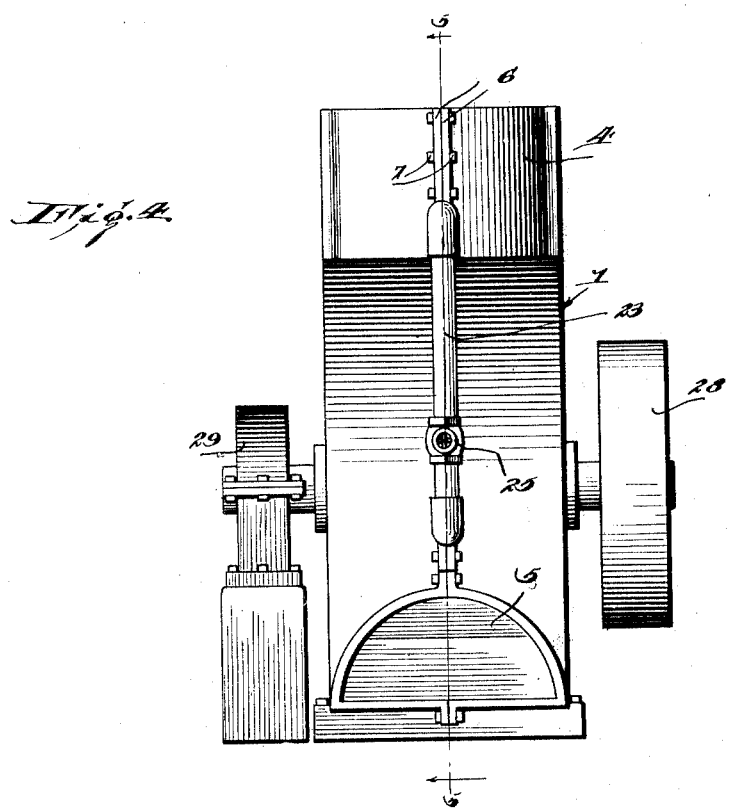
Figure 5:
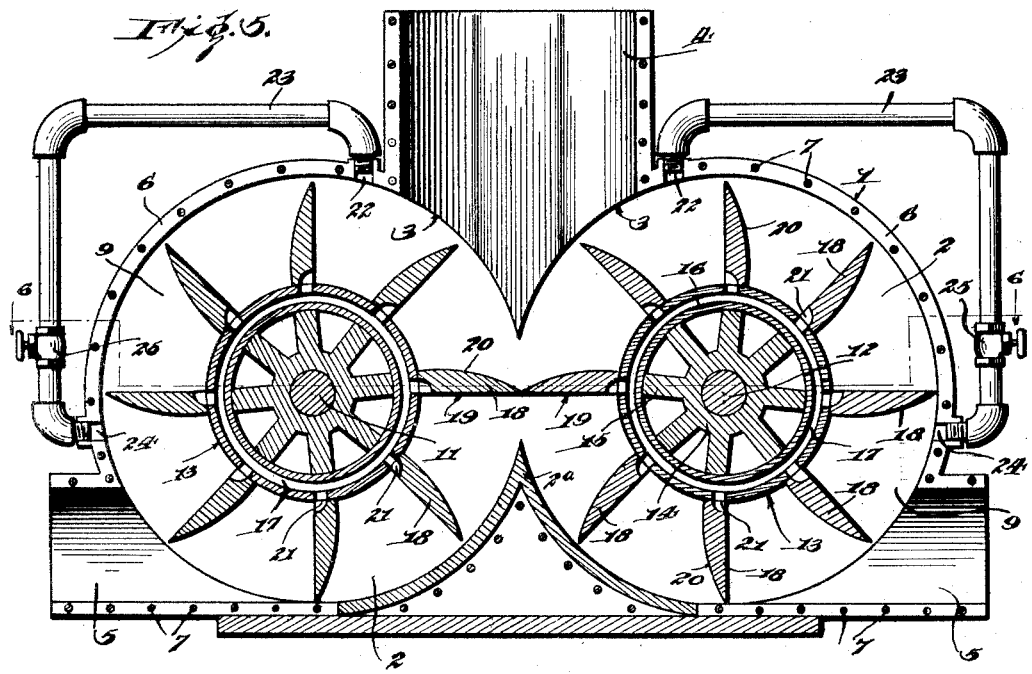

Additional objects, advantages and features of invention will be apparent from the following description, considered in conjunction with the accompanying drawings forming a part of this application, wherein, Figure 1 is a side elevation of a motor constructed in accordance with my invention, Figure 2 is a similar view showing the opposite side thereof, Figure 3 is a top plan view, Figure 4 is an end elevation of the motor, Figure 5 is a cross section on the line 5—5 of Figure 4.

Figure 6:
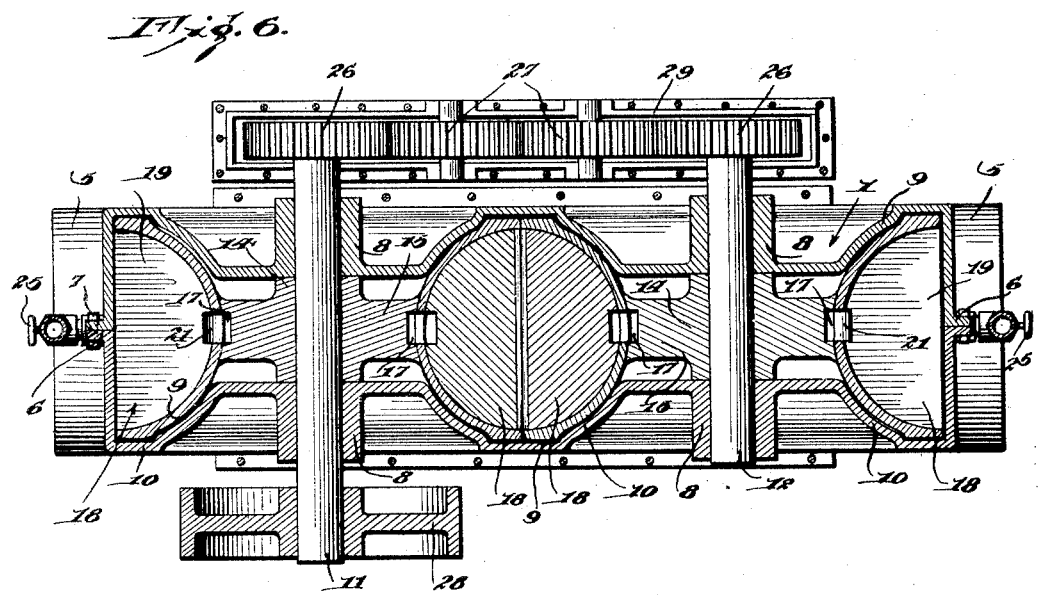

Figure 6 is a cross section on the line 6—6 of Figure 5.

In carrying out my invention, I provide a casing, generally indicated by the reference numeral 1, which comprises two circular chambers 2 arranged in side by side relation and has a dividing partition 2a. The upper part of each chamber is cut away to provide an inlet 3. Any suitable source of water supply may be employed, and is connected to the pipe 4, in any approved manner. Each of the chambers 2 is provided with an outlet 5 disposed at the lower part of the chambers 2.

The casing 1 is preferably formed in two half-sections, each of which is flanged as at 6 and adapted to be brought into mating relation for securement by bolts 7. Each section 2 of the casing has a journal bearing 8, and outwardly from each side thereof, the sections 2 are grooved as at 9, so as to provide circular cylinders 10.

Shafts 11 and 12 are revolubly mounted within the journals 8, and keyed upon these shafts are rotors 13. The rotors comprise a hub portion 14 having a plurality of radial disposed arms 15, upon which there is mounted a drum 16, the latter having a semicircular channel around its periphery and a circumscribing air passageway 17.

A plurality of contact blades or paddles 18 are mounted in the semi-circular channel in a radial direction.

The contact blades or paddles 18, in the present instance, have a flat face 19, and a curved back portion 20, the curvature of the portion 20 tapering toward the outer extremity of the contact blades or paddles. At the juncture of the contact blades or paddles with the semi-circular channel, the flat face 19 is provided with an opening 21 which is in communication with the air-passageway 17.

In order to relieve air that may be pocketed between the contact blades or paddles 18, I provide an air opening 22, which is preferably positioned closely adjacent the inlet 3. A suitable conduit 23 is connected to the air opening 22 and has a discharge opening 24 adjacent the outlet 5. A valve 25 may be interposed in the conduit 23, to regulate the air discharge.

Reference is now made to Figure 6 of the drawings, wherein it will be seen that the shafts 11 and 12 have gears 26 keyed thereto, upon one side, between which a pair of gears 27 are in mesh. It will thus be seen that the rotors are effectively geared to one another. A power take-off pulley 28 is keyed upon the shaft 11, as shown. In the present instance, the gears 26 and 27 are housed within a casing 29.

In the operation of my motor, water under pressure is admitted through the inlet 4 from whence it enters the chambers 2, by virtue of the openings 3. Attention is directed to Figure 5, wherein it is seen that one contact blade or paddle 18 of each rotor 13 is in end to end relation, and directly in the path of the incoming water. It should also be noted that the curved surface 20 of the contact blades is disposed toward the incoming water, and by reason of such curvature, water is directed toward the outer extremity of the contact blades thus materially increasing the leverage of the rotors.

The impact of the water on the contact blades will cause rotation of the rotors 13 as indicated by the arrows in Figure 5. By reason of the gearing 26—27, the two rotor members 13 are caused to transmit a unitary rotary movement to the pulley 28. Advantage may be taken of the rotary movement of the pulley 28 in any approved manner, as by a belt, not shown.

It is a well known fact that in the operation of water motors, considerable air is entrained with the water employed for operating such motors, this air being of such bulk, in all instances, as to effectively reduce the efficiency of the motor, due to its resistance to the rotation of the rotors. In my device, however, air entrained with the water is removed from the space between the paddles 18, by the air passageway 17 of the rotor. During the rotation of the rotors, water filling the pockets between the paddles 18 will force any air confined therein into the opening 21, and into the circumscribing air passageway 17. The air will be forced around the air passageway 17 until it is released at the discharge opening 5. The air passageways 17 and 21 cannot account for all the air within the pockets, and especially is this true of the air confined at the upper part of the pockets. However, such air finds its release by virtue of the opening 23. The escape of the air through the conduit may be retarded by manipulation of the valve 25. By retarding the escape of air, the rotation of the rotors can be regulated, by increasing the resistance to the rotors.

From the foregoing it will be seen that I have provided a motor of simple construction, and which will be efficient in operation.

I claim:

1. A water motor comprising a casing having an inlet and an outlet, two water wheels rotatably supported therein and having their outer circumferences in contact, each wheel having a semi-circular channel, a plurality of contact blades or paddles secured radially in said channels, said blades or paddles being thick at the base and tapering to a sharp edge at the tip, and rounded on the side which receives the impact of the operating fluid.

2. A water motor comprising a casing having an inlet and an outlet, two water wheels rotatably supported therein and having their outer circumferences in contact, said casing having an air escape opening near the inlet and an air discharge opening near the outlet and a pipe connecting the escape and discharge openings.

3. A water motor comprising a casing having an inlet and an outlet, two water wheels rotatably supported therein and having their outer circumferences in contact, said wheels having air passageways in the inner portion of the semi-circular channels leading from the spaces between the paddles.

4. A water motor as claimed in claim 2, in which valves are provided in the pipes to control the speed of the wheel.

5. A water motor as claimed in claim 1, in which the rotatable support for each water wheel comprises a shaft, a gear keyed to each shaft and intermediate gears between the gears on each shaft for causing the water wheels to rotate at the same speed.

AUGUST S. CHRISTENSEN.